F. A. ELLIS, Jr.
WHEEL.
APPLICATION FILED OCT. 28, 1913.
1,183,177. Patented May 16, 1916.
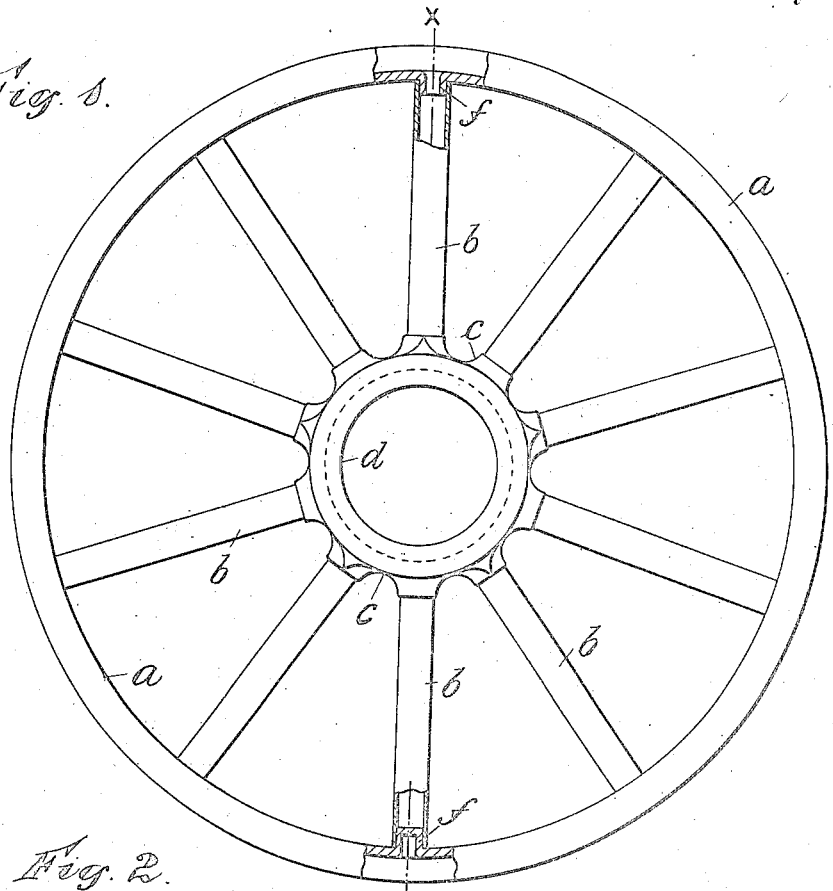
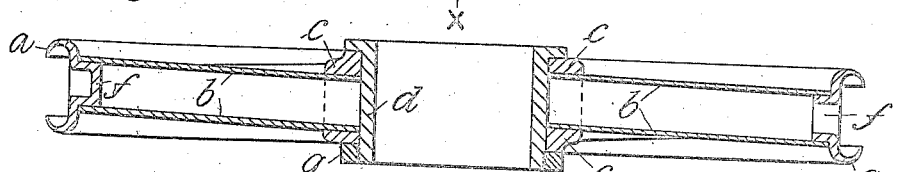
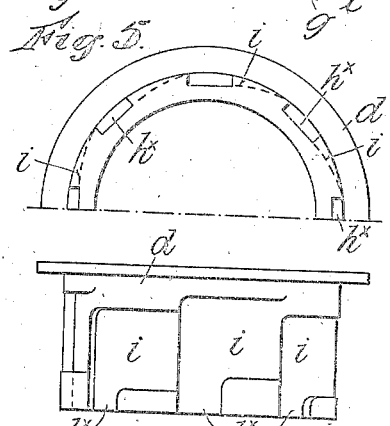
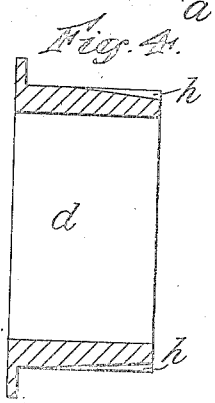

UNITED STATES PATENT OFFICE.

FREDERICK ARTHUR ELLIS, JR., OF BIRMINGHAM, ENGLAND.

WHEEL.

1,183,177.     Specification of Letters Patent.     Patented May 16, 1916.

Application filed October 28, 1913. Serial No. 797,713.

*To all whom it may concern:*

Be it known that I, FREDERICK ARTHUR ELLIS, Jr., a subject of the King of Great Britain, residing at Birmingham, in the county of Warwick, England, engineer, have invented new and useful Improvements in Wheels, of which the following is a specification.

This invention relates to improvements in the manufacture of wheels of the kind in which the spokes are first placed more or less loosely in position and are afterward forced radially outward by means of a bush or sleeve inserted into the hub and brought to bear against the inner ends of the spokes. Various devices of a more or less complicated character have been proposed for effecting this radial locking of the spokes in position, and the object of the present invention is to provide for the construction of a wheel of this kind in a simpler, less expensive, and more practicable manner than heretofore. Wheels of all kinds may be constructed according to my invention, and may be used for various industrial purposes, as for example, road wheels for vehicles, pulleys for driving machinery, drums for line shafting, and the like.

According to my present invention I take a cylinder of steel or other suitable material of any convenient section, which will be hereinafter referred to as the hollow boss, and in this hollow boss I provide any suitable number of radial holes of any shape adapted to receive and correspond with the number and shape of spokes to be employed. The rim, which may be constructed in any known manner, is provided on its internal circumference with projections, studs, indentations, or the like formed out of the material of the rim itself to receive the several spokes. The spokes are preferably made from suitable lengths cut from drawn steel tube, for example, but they may be of other suitable material, as for example of wood. These lengths of tube, which may be of oval or other section, are then prepared at the one end by suitable press or swaging tools, to fit more or less closely the holes in the hollow boss, and at the other end the studs or the like on the interior of the rim. These several parts are then assembled together, being placed in a suitable jig, with the inner ends of the spokes projecting through the hollow boss to a limited extent, and by forcing a bush or sleeve by any convenient means into the interior of the said hollow boss the several spokes are pressed radially outward toward and against the rim, whereby the whole is securely and rigidly held together.

In the accompanying drawings Figure 1 shows an elevation partly in section of a road wheel constructed in accordance with my present invention; Fig. 2 a section on line X—X of Fig. 1; Fig. 3 a detail of the end of a spoke; and Figs. 4, 5 and 6 detail views of spoke-tightening devices.

Similar letters of reference relate to like parts in all the figures of the drawings.

*a* is the rim of the wheel which may be of any desired section and construction; *b* are the spokes which are shown in Figs. 1 and 2 as plain lengths of metal tube of elliptical section, but may be shaped, as shown for example, in Fig. 3; *c* is the hollow boss, and *d* the central sleeve or bush, which may be provided with any suitable ball or other bearings as may be desired, and in the case of a driving pulley for machinery may be provided with a keyway or the like for securing the same to the shaft.

The rim *a* is provided with projections upon its internal circumference to receive the outer ends of the spokes *b*. These projections are formed by puncturing or pressing the said rim and swaging out the metal as shown at *f* in Figs. 1 and 2. The inner ends of the spokes *b* are first placed in the holes of the hollow boss *c*, the rim *a* is then placed in position and the outer ends of the spokes *b* are placed over the projections *f*, and the central sleeve or bush *d* is forced into the hole in the hollow boss *c* thereby securing each spoke *b* in position by bearing upon their inner ends. The spokes *b* when thus pressed into position may be then welded by what is known as the autogenous process, or be connected by any other suitable means both to the rim *a*, to the projections *f* thereon, and also to the hollow boss, thereby rigidly fixing the several parts together, the sleeve or bush being secured in place longitudinally by any convenient means, as for example by means of the screw-nut *g*, or otherwise.

When using lengths of drawn steel tube as before described for the spokes, it is sometimes desirable to fill in the end or ends with a metallic core which may be secured therein in any convenient manner.

In order to enable pressure to be applied to the inner ends of the spokes $b$, the outer circumference of the sleeve or bush $d$ may be provided with longitudinally disposed inclined surfaces $h$ (Fig. 4) to correspond with the several spokes $b$ employed, whereby increased pressure may be imparted to the said spokes, according to the extent to which the said sleeve or bush $d$ is inserted in the hollow boss $c$. Or the sleeve or bush $d$ may be provided with plain longitudinal grooves $h^x$ (Figs. 5 and 6) terminating in segmental, circumferential or annular inclined grooves $i$ corresponding to the number of spokes $b$ employed, pressure being applied to all the spokes $b$ simultaneously on the said sleeve or bush $d$ being partially rotated.

By dividing the rim into two or more parts, a very portable wheel may be constructed as hereinbefore described.

In the case of using wire spokes as commonly employed in motor-car wheel construction, instead of putting the spokes in compression as hereinbefore described they must be put in tension, and this may be effected by providing on the inner ends of the spokes, heads of suitable shape which take into grooves provided in the sleeve or bush situated longitudinally or segmentally and annularly thereof as hereinbefore described but modified so as to effect the drawing inward of the spokes instead of the pressing outward thereof.

Claim:

In a wheel, in combination, a hub, hollow spokes projecting from the hub, and a rim having hollow projections fitting into the outer ends of the respective spokes, the said projections being open at both ends.

In testimony whereof I have signed my name to this specification in the presence of two subscribing witnesses.

FREDERICK ARTHUR ELLIS, Jnr.

Witnesses:
ALBERT EDWARD LAWLEY,
ERNEST PARKER.